US012579438B2

(12) United States Patent
Hafner et al.

(10) Patent No.: US 12,579,438 B2
(45) Date of Patent: Mar. 17, 2026

(54) SAMPLE-EFFICIENT REINFORCEMENT LEARNING

(71) Applicant: GOOGLE LLC, Mountain View, CA (US)

(72) Inventors: Danijar Hafner, London (GB); Jacob Buckman, San Francisco, CA (US); Honglak Lee, Mountain View, CA (US); Eugene Brevdo, San Bruno, CA (US); George Jay Tucker, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 981 days.

(21) Appl. No.: 17/056,640

(22) PCT Filed: May 20, 2019

(86) PCT No.: PCT/US2019/033138
§ 371 (c)(1),
(2) Date: Nov. 18, 2020

(87) PCT Pub. No.: WO2019/222745
PCT Pub. Date: Nov. 21, 2019

(65) Prior Publication Data
US 2021/0201156 A1 Jul. 1, 2021

Related U.S. Application Data

(60) Provisional application No. 62/673,838, filed on May 18, 2018.

(51) Int. Cl.
*G06N 3/084* (2023.01)
*G06N 3/045* (2023.01)
*G06N 3/092* (2023.01)

(52) U.S. Cl.
CPC ............. *G06N 3/084* (2013.01); *G06N 3/045* (2023.01); *G06N 3/092* (2023.01)

(58) Field of Classification Search
CPC .......... G06N 3/092; G06N 3/08; G06N 3/084; G06N 3/045; G06N 3/047; G06N 3/082; G06N 3/006
See application file for complete search history.

(56) References Cited

U.S. PATENT DOCUMENTS

2017/0032245 A1* 2/2017 Osband .................... G06N 3/08
2017/0157767 A1* 6/2017 Takamizawa .......... B25J 9/1697

FOREIGN PATENT DOCUMENTS

CN 105637540 6/2016

OTHER PUBLICATIONS

Watkins et al., "Q-Learning", May 1992, Machine Learning 8, pp. 279-292 (Year: 1992).*

(Continued)

*Primary Examiner* — Leonard A Sieger
(74) *Attorney, Agent, or Firm* — Fish & Richardson P.C.

(57) ABSTRACT

Methods, systems, and apparatus, including computer programs encoded on computer storage media, for sample-efficient reinforcement learning. One of the methods includes maintaining an ensemble of Q networks, an ensemble of transition models, and an ensemble of reward models; obtaining a transition; generating, using the ensemble of transition models, M trajectories; for each time step in each of the trajectories: generating, using the ensemble of reward models, N rewards for the time step, generating, using the ensemble of Q networks, L Q values for the time step, and determining, from the rewards, the Q values, and the training reward, L*N candidate target Q values for the trajectory and for the time step; for each of the time steps, combining the candidate target Q values; deter- (Continued)

mining a final target Q value; and training at least one of the Q networks in the ensemble using the final target Q value.

20 Claims, 5 Drawing Sheets

(56) References Cited

OTHER PUBLICATIONS

Hu et al., "Learning in Multi-agent Systems with Sparse Interactions by Knowledge Transfer and Game Abstraction", May 2015, Proceedings of the 14th International Conference on Autonomous Agents and Multiagent Systems (AAMAS 2015), pp. 1-9 (Year: 2015).*

Jeong et al., "Bayesian Q-Learning with Assumed Density Filtering", 2017, 31st Conference on Neural Information Processing Systems, pp. 1-10 (Year: 2017).*

Chen et al., "UCB Exploration via Q-Ensembles", Nov. 7, 2017, pp. 1-16 (Year: 2017).*

Feinberg et al., "Model-Based Value Expansion for Efficient Model-Free Reinforcement Learning", Feb. 28, 2018, pp. 1-12 (Year: 2018).*

Chen et al., "Ensemble Network Architecture for Deep Reinforcement Learning", Apr. 5, 2018, Mathematical Problems in Engineering, pp. 1-7 (Year: 2018).*

Chen et al., "Ensemble Network Architecture for Deep Reinforcement Learning", Apr. 5, 2018, Mathematical Problems in Engineering, vol. 2018, pp. 1-6 (Year: 2018).*

Anschel et al., "Averaged-DQN: Variance Reduction and Stabilization for Deep Reinforcement Learning", 2017, Proceedings of the 34th International Conference on Machine Learning, vol. 34, pp. 1-10 (Year: 2017).*

Menon et al., "Shared Learning : Enhancing Reinforcement in Q-Ensembles", 2017, arXIv, v1, pp. 1-9 (Year: 2017).*

Moerland et al., "Emotion in reinforcement learning agents and robots: a survey", 2017, Machine Learning, vol. 107, pp. 443-480 (Year: 2017).*

Harutyunyan et al., "Off-Policy Reward Shaping with Ensembles", 2015, arXiv, v2, pp. 1-8 (Year: 2015).*

Abadi et al., "Tensorflow: A system for large-scale machine learning," In12th {USENIX} symposium on operating systems design and implementation, Nov. 2016, 265-283.

Barth-Maron et al., "Distributed distributional deterministic policy gradients," arXiv preprint arXiv:1804.08617, Apr. 2018, 16 pages.

Brockman et al., "Openai gym," arXiv preprint arXiv:1606.01540, Jun. 2016, 4 pages.

Chen et al., "UCB Exploration via Q-Ensembles," arXiv preprint arXiv:1706.01502, Jun. 2017, 16 pages.

Deisenroth et al., "PILCO: A model-based and data-efficient approach to policy search," Proceedings of the 28th International Conference on machine learning, 2011, 465-472.

Depeweg et al., "Learning and policy search in stochastic dynamical systems with bayesian neural networks," arXiv preprint arXiv:1605.07127, May 2016, 14 pages.

Espeholt et al., "Impala: Scalable distributed deep-rl with importance weighted actor-learner architectures," arXiv preprint arXiv:1802.01561, Feb. 2018, 22 pages.

Feinberg et al., "Model-based value estimation for efficient model-free reinforcement learning," arXiv preprint arXiv:1803.00101, Feb. 2018, 12 pages.

Fleiss et al., "Review papers: The statistical basis of meta-analysis," Statistical methods in medical research, Aug. 1993, 26 pages.

Fujimoto et al., "Addressing function approximation error in actor-critic methods," International Conference on Machine Learning, Jul. 2018, 1587-1596.

Gal et al., "Dropout as a bayesian approximation: Representing model uncertainty in deep learning," In international conference on machine learning, Jun. 2016, 1050-1059.

Gal et al., "Improving PILCO with Bayesian neural network dynamics models," Data-Efficient Machine Learning workshop, Apr. 2016, 4:34, 7 pages.

GitHub.com [online], "Openai / Roboschool," retrieved Dec. 18, 2020, retrieved from URL https://github.com/openai/roboschool, 7 pages.

Gu et al., "Continuous deep q-learning with model-based acceleration," In International Conference on Machine Learning, Jun. 2016, 2829-2838.

Gu et al., "Q-prop: Sample-efficient policy gradient with an off-policy critic," arXiv preprint arXiv:1611.02247, Nov. 2016, 13 pages.

Haarnoja et al., "Soft actor-critic: Off-policy maximum entropy deep reinforcement learning with a stochastic actor," arXiv preprint arXiv:1801.01290, Jan. 2018, 14 pages.

Horgan et al., "Distributed prioritized experience replay," arXiv preprint arXiv:1803.00933, Mar. 2018, 19 pages.

Heess et al., "Learning continuous control policies by stochastic value gradients," arXiv preprint arXiv:1510.09142, Oct. 2015, 13 pages.

Kalweit et al., "Uncertainty-driven imagination for continuous deep reinforcement learning," In Conference on Robot Learning, Oct. 2017, 195-206.

Kingma et al., "Adam: A method for stochastic optimization, International Conference," Learning Representations (ICLR), 2015, 15 pages.

Kurutach et al., "Model-ensemble trust-region policy optimization," arXiv preprint arXiv:1802.10592, Feb. 2018, 15 pages.

Lillicrap et al., "Continuous control with deep reinforcement learning," arXiv preprint arXiv:1509.02971, Sep. 2015, 14 pages.

MacKay et al., "A practical Bayesian framework for backpropagation networks," Neural computation, May 1992, 4(3):448-72.

Mnih et al., "Playing atari with deep reinforcement learning," arXiv preprint arXiv:1312.5602, Dec. 2013, 9 pages.

Munos et al., "Safe and efficient off-policy reinforcement learning," arXiv preprint arXiv:1606.02647, Jun. 2016, 18 pages.

Osband et al., "Deep exploration via bootstrapped DQN," Advances in neural information processing systems, 2016, 29:4026-34.

PCT International Preliminary Report on Patentability in International Appln. No. PCT/US2019/033138, dated Dec. 3, 2020, 9 pages.

PCT International Search Report and Written Opinion in International Appln. No. PCT/US2019/033138, dated Sep. 3, 2019, 15 pages.

Schulman et al., "Proximal policy optimization algorithms," arXiv preprint arXiv:1707.06347, Jul. 2017, 12 pages.

Silver et al., "Mastering the game of Go with deep neural networks and tree search," nature, Jan. 2016, 529(7587):484-9, 20 pages.

Sutton et al., "Integrated architectures for learning, planning, and reacting based on approximating dynamic programming," In Machine learning proceedings, Jan. 1990, 216-224.

Sutton et al., "Reinforcement Learning: An Introduction," MIT Press Cambridge, 1998, 7 pages.

Weber et al., "Imagination-augmented agents for deep reinforcement learning," arXiv preprint arXiv:1707.06203, Jul. 2017, 20 pages.

EP Office Action in European Appln. No. 19732151.6, dated Aug. 18, 2022, 9 pages.

Notice of Allowance in Chinese Application No. 201980032627.6, mailed Sep. 24, 2024, 7 pages (with English translation).

* cited by examiner

300

Obtain transition ⎞ 302

Generate *M* trajectories ⎞ 304

Generate candidate target Q values for each time step in each trajectory ⎞ 306

Combine the target Q values for each time step to generate combined target Q value ⎞ 308

Determine final target Q value ⎞ 310

Train at least one of the Q networks ⎞ 312

400

500

SAMPLE-EFFICIENT REINFORCEMENT LEARNING

CROSS-REFERENCE TO RELATED APPLICATIONS

This application is a national stage application filed under 35 U.S.C. 371, of PCT application serial number PCT/US2019/033138, filed May 20, 2019, which claims priority to U.S. provisional application Ser. No. 62/673,838, filed May 18, 2018. The entirety of each of the foregoing applications is hereby incorporated by reference.

BACKGROUND

This specification relates to reinforcement learning, particularly to reinforcement learning for agents interacting with a real-world environments In a reinforcement learning system, an agent interacts with an environment by performing actions that are selected by the reinforcement learning system in response to receiving observations that characterize the current state of the environment.

Some reinforcement learning systems select the action to be performed by the agent in response to receiving a given observation in accordance with an output of a neural network.

Neural networks are machine learning models that employ one or more layers of nonlinear units to predict an output for a received input. Some neural networks are deep neural networks that include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification generally describes a reinforcement learning system that trains a Q neural network. In some cases, the Q neural network is used to train a policy neural network that is then used to select actions to be performed by a reinforcement learning agent (e.g. a robotic or other mechanical agent) interacting with a physical real-world environment. In other cases, the Q neural network is directly used to select actions to be performed by the reinforcement learning agent interacting with the environment.

During the training, the system maintains an ensemble of Q networks, each Q network being a neural network that is configured to receive a Q network input that includes (i) an input observation characterizing a state of an environment being interacted with by an agent and (ii) data identifying an action from a set of actions and process the Q network input to generate a Q value for the input observation-action pair.

The system also maintains an ensemble of transition models, each transition model being configured to receive a transition input that includes (i) an input observation and (ii) an action performed by the agent in response to the input observation and to process the transition input to generate a predicted next observation characterizing a state that the environment transitioned into as a result of the agent performing the action in response to the observation.

The system also maintains an ensemble of reward models, each reward model being configured to receive a reward input that includes (i) an input observation, (ii) an action performed by the agent in response to the input observation, and (iii) a next observation characterizing a state that the environment transitioned into as a result of the agent performing the action in response to the observation and to process the reward input to generate a predicted reward received by the agent in response to performing the action.

The system then uses the ensembles of Q networks, transition models, and reward models to generate target Q values for transitions and then uses those target Q values to train the ensemble of Q networks. In particular, the system generates multiple different trajectories from a single transition and then interpolates between target Q values as of multiple different time steps within the multiple trajectories to determine the final target Q value for the transition.

Particular embodiments of the subject matter described in this specification can be implemented so as to realize one or more of the following advantages.

Model-based reinforcement learning approaches use an environment dynamics model to predict future states of the environment during the training of a policy neural network. These approaches can yield high-performing policies while greatly reducing the complexity and time required to learn the policy. However, in environments that have complex dynamics, e.g., in real-world environments interacted with by robots or other mechanical agents, predictions made by the dynamics model will be error-prone and introduce a bias into the learning process. This often causes existing approaches that use a dynamics model to fail to learn a high-performing policy. The described techniques, however, account for bias and uncertainty in the dynamics model that arise in complex environments to allow an effective policy to be learned with much greater sample efficiency even for very complex tasks. In particular, by employing ensembles of models and combining target outputs both from trajectories of different lengths and from multiple trajectories of the same length, the described techniques can account for dynamics model uncertainty and Q network bias while still reducing the number of actual samples from the environment that are required to learn an effective policy. This is particularly advantageous in cases where the agent is a robot or other mechanical agent interacting with the real-world environment because collecting actual samples from the environment adds wear to the agent, increases the chance of mechanical failure of the agent, and is very time-intensive. Additionally, even when maintaining a highly-accurate model of the environment is possible, the described techniques can allow for a less computationally-intensive model to be employed that may not be as accurate, reducing the computational overhead of the training process. As a particular example, the described techniques can be used to learn an effective policy for controlling agents in continuous control tasks, i.e., tasks in which the space of actions to be performed by the agent is continuous, in a computationally efficient manner.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
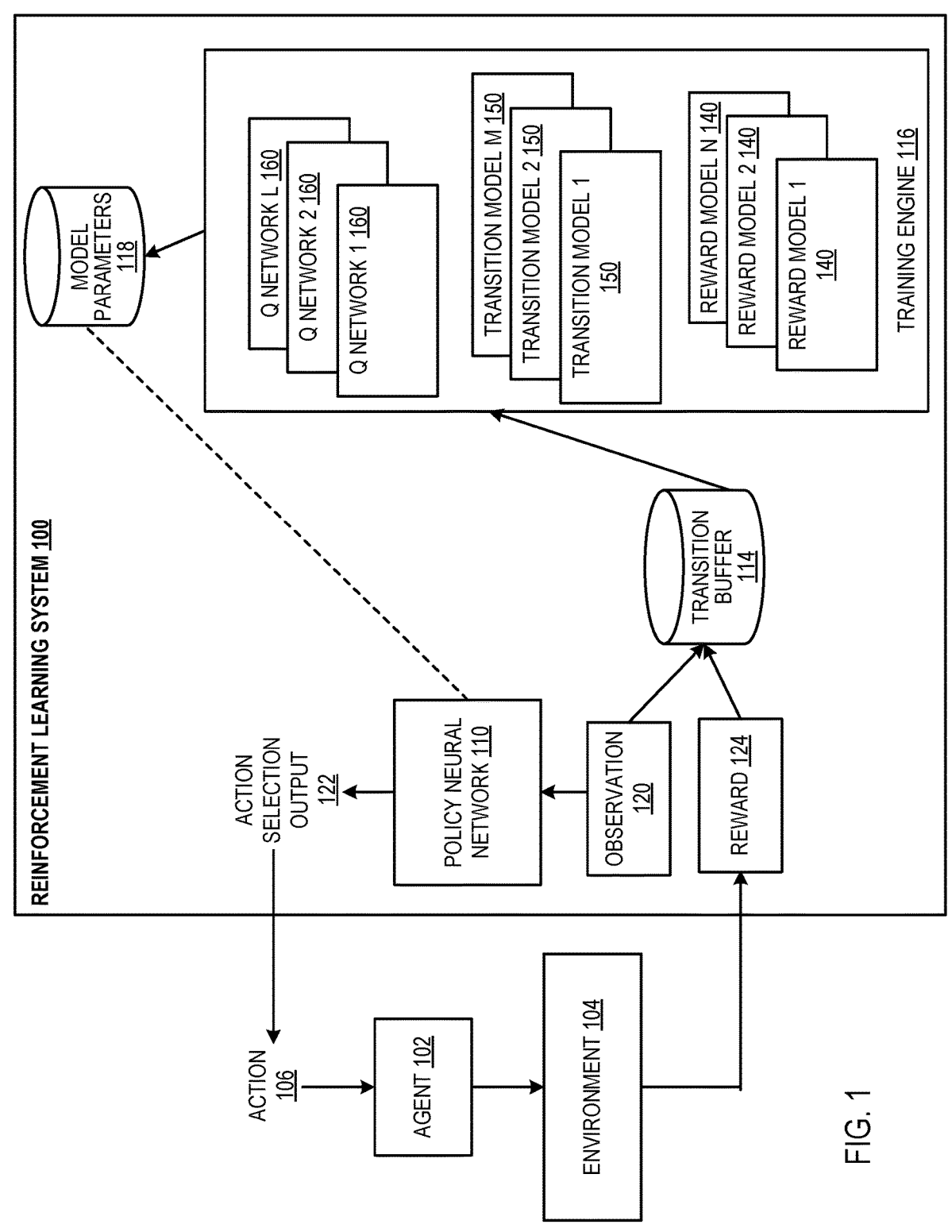
FIG. 1 shows an example reinforcement learning system.

This specification describes a reinforcement learning system that controls an agent interacting with an environment by, at each of multiple time steps, processing data characterizing the current state of the environment at the time step (i.e., an "observation") to select an action to be performed by the agent.

At each time step, the state of the environment at the time step depends on the state of the environment at the previous time step and the action performed by the agent at the previous time step.

In some implementations, the environment is a real-world environment and the agent is a mechanical agent interacting with the real-world environment, e.g., a robot or an autonomous or semi-autonomous land, air, or sea vehicle navigating through the environment.

In these implementations, the observations may include, e.g., one or more of: images, object position data, and sensor data to capture observations as the agent interacts with the environment, for example sensor data from an image, distance, or position sensor or from an actuator.

For example in the case of a robot, the observations may include data characterizing the current state of the robot, e.g., one or more of: joint position, joint velocity, joint force, torque or acceleration, e.g., gravity-compensated torque feedback, and global or relative pose of an item held by the robot.

In the case of a robot or other mechanical agent or vehicle the observations may similarly include one or more of the position, linear or angular velocity, force, torque or acceleration, and global or relative pose of one or more parts of the agent. The observations may be defined in 1, 2 or 3 dimensions, and may be absolute and/or relative observations.

The observations may also include, for example, sensed electronic signals such as motor current or a temperature signal; and/or image or video data for example from a camera or a LIDAR sensor, e.g., data from sensors of the agent or data from sensors that are located separately from the agent in the environment.

In the case of an electronic agent the observations may include data from one or more sensors monitoring part of a plant or service facility such as current, voltage, power, temperature and other sensors and/or electronic signals representing the functioning of electronic and/or mechanical items of equipment.

In these implementations, the actions may be control inputs to control the robot, e.g., torques for the joints of the robot or higher-level control commands, or the autonomous or semi-autonomous land, air, sea vehicle, e.g., torques to the control surface or other control elements of the vehicle or higher-level control commands.

In other words, the actions can include for example, position, velocity, or force/torque/acceleration data for one or more joints of a robot or parts of another mechanical agent. Action data may additionally or alternatively include electronic control data such as motor control data, or more generally data for controlling one or more electronic devices within the environment the control of which has an effect on the observed state of the environment. For example in the case of an autonomous or semi-autonomous land or air or sea vehicle the actions may include actions to control navigation e.g. steering, and movement e.g., braking and/or acceleration of the vehicle.

In some other applications the agent may control actions in a real-world environment including items of equipment, for example in a data center, in a power/water distribution system, or in a manufacturing plant or service facility. The observations may then relate to operation of the plant or facility. For example the observations may include observations of power or water usage by equipment, or observations of power generation or distribution control, or observations of usage of a resource or of waste production. The actions may include actions controlling or imposing operating conditions on items of equipment of the plant/facility, and/or actions that result in changes to settings in the operation of the plant/facility e.g. to adjust or turn on/off components of the plant/facility.

FIG. 1 shows an example reinforcement learning system 100. The reinforcement learning system 100 is an example of a system implemented as computer programs on one or more computers in one or more locations in which the systems, components, and techniques described below are implemented.

The system 100 controls an agent 102 interacting with an environment 104 by selecting actions 106 to be performed by the agent 102 that cause the state of the environment to transition into new states.

The system 100 includes a policy neural network 110, a training engine 116, and a set of model parameters 118 of the policy neural network 110.

At each of multiple time steps, the policy neural network 110 is configured to process an input that includes the current observation 120 characterizing the current state of the environment 104 in accordance with the model parameters 118 to generate an action selection output 122 ("action selection policy").

The system 100 uses the action selection output 122 to select the action 106 to be performed by the agent at the current time step. A few examples of using the action selection output 122 to select the action 106 to be performed by the agent are described next.

In one example, the action selection output 122 may include a respective numerical probability value for each action in a set of possible actions that can be performed by the agent. The system 100 can select the action to be performed by the agent, e.g., by sampling an action in accordance with the probability values for the actions, or by selecting the action with the highest probability value.

In another example, the action selection output 122 may directly define the action to be performed by the agent, e.g., by defining the values of torques that should be applied to the joints of a robotic agent.

In another example, the action selection output 122 may include a respective Q-value for each action in the set of possible actions that can be performed by the agent. The system 100 can process the Q-values (e.g., using a soft-max function) to generate a respective probability value for each possible action, which can be used to select the action to be performed by the agent (as described earlier). The system 100 could also select the action with the highest Q-value as the action to be performed by the agent.

The Q value for an action is an estimate of a "return" that would result from the agent performing the action in response to the current observation 120 and thereafter selecting future actions performed by the agent 102 in accordance with current values of the policy neural network parameters.

A return refers to a cumulative measure of "rewards" 124 received by the agent, for example, a time-discounted sum of rewards. The agent can receive a respective reward 124 at each time step, where the reward 124 is specified by a scalar numerical value and characterizes, e.g., a progress of the agent towards completing an assigned task.

In some cases, the system 100 can select the action to be performed by the agent in accordance with an exploration policy. For example, the exploration policy may be an $\epsilon$-greedy exploration policy, where the system 100 selects the action to be performed by the agent in accordance with the action selection output 122 with probability $1-\epsilon$, and randomly selects the action with probability $\epsilon$. In this example, $\epsilon$ is a scalar value between 0 and 1.

The policy neural network 110 can have any of a variety of neural network architectures. For example, the architecture of the policy neural network 110 may include a sequence of one or more convolutional layers, followed by a recurrent layer (e.g., a long short-term memory (LSTM) layer) and an output layer that generates the action selection policy. As another example, the architecture may be that of a feedforward neural network, e.g., with a stack of four, six, or eight fully-connected layers.

The training engine 116 is configured to train the policy neural network 110 by repeatedly updating the model parameters 118 of the policy neural network 110 based on the interactions of the agent with the environment.

In particular, during training, transitions generated as a result of the agent interacting with the environment are stored in a transition buffer 114. Each transition includes an initial observation, the action performed by the agent in response to the initial observation, a reward, and a next observation characterizing the next state of the environment.

The training engine 116 can train the policy neural network 110 to increase the return (i.e., cumulative measure of reward) received by the agent using reinforcement learning techniques by sampling transitions from the transition buffer 114. Because rewards measure progress of the agent in completing a task, training the policy neural network 110 to increase returns results in the agent being able to successfully complete specified tasks while being controlled by the policy neural network 110.

In particular, the training engine 116 maintains an ensemble of L Q networks 160A-L, an ensemble of M transition models 150A-M, and an ensemble of N reward models 140A-N. Generally, L, M and N are all fixed integer values that are greater than one and may be the same value or may be different from one another.

Each Q network in the ensemble is a neural network that is configured to receive a Q network input that includes (i) an input observation characterizing a state of an environment being interacted with by an agent and (ii) data identifying an action from a set of actions and process the Q network input to generate a Q value for the input observation-action pair.

In some cases, the ensemble of Q networks collectively is the policy neural network 110, i.e., the system 100 uses outputs generated by the Q networks in the ensemble to control the agent and the model parameters 118 are the parameters of the ensemble of Q networks.

In other cases, the system uses the ensemble of Q networks in updating the model parameters 118 of a separate policy neural network 110.

As a particular example, the policy neural network 110 can generate action selection outputs 122 that directly define the action to be performed by the agent, e.g., by defining the values of torques that should be applied to the joints of a robotic agent, and the training engine 116 can use the Q networks 160 to update the model parameters 118 of the policy neural network 110 using a policy gradient reinforcement learning technique, e.g., a deep deterministic policy gradient (DDPG) reinforcement learning technique. In other words, the training engine 116 can train the Q networks jointly with the policy neural network 110 using a policy gradient technique. This scheme may be employed when the action space is continuous.

As another particular example, the policy neural network 110 can generate action selection outputs 122 that define probability distributions over possible actions be performed by the agent and the training engine 116 can use the Q networks 160 to update the model parameters 118 of the policy neural network 110 using an actor-critic reinforcement learning technique, e.g., an asynchronous advantage actor-critic (A3C) reinforcement learning technique. In other words, the training engine 116 can train the Q networks jointly with the policy neural network 110 using an actor-critic technique.

Generally, the system initializes the parameter values of each Q network in the ensemble independently at the outset of training and, as described below, trains each Q network on different training data so that the values of the parameters of the Q networks will all be different during the training.

Each transition model in the ensemble is configured to receive a transition input that includes (i) an input observation and (ii) an action performed by the agent in response to the input observation and to process the transition input to generate a predicted next observation characterizing a state that the environment transitioned into as a result of the agent performing the action in response to the observation. In other words, the transition model is configured to predict the effect on the environment of the agent performing the input action when the environment is in the state characterized by the input observation.

Each reward model in the ensemble is configured to receive a reward input that includes (i) an input observation, (ii) an action performed by the agent in response to the input observation, and (iii) a next observation characterizing a state that the environment transitioned into as a result of the agent performing the action in response to the observation and to process the reward input to generate a predicted reward received by the agent in response to performing the action.

The Q network, the transition models, and the reward models can have any of a variety of model architectures. For example, all of the models in the ensemble can be neural networks. The architecture of any or all of these neural networks can include include a sequence of one or more convolutional layers, followed by a recurrent layer (e.g., a long short-term memory (LSTM) layer) and an output layer that generates the appropriate output. As another example, the architecture may be that of a feedforward neural network, e.g., with a stack of four, six, or eight fully-connected layers. In another example, the Q network can be a neural network having one of the above architectures while the reward model, the transition model, or both are other types of machine learning models, e.g., random forest, support vector machines, decision tree-based models, and so on.

The training engine 116 uses the ensembles of Q networks, transition models, and reward models to generate target Q values for transitions sampled from the transition buffer 114 and then uses those target Q values to train the ensemble of Q networks, which either collectively make up the policy neural network 110 or are used to repeatedly update the model parameters of the policy neural network 110, i.e., using one of the techniques described above.

In particular, upon sampling a transition from the transition buffer 114, the training engine 116 generates multiple different trajectories using the policy neural network 110 and the ensemble of trajectory models.

That is, the engine 116 generates multiple different trajectories from a single transition.

Figure 2:
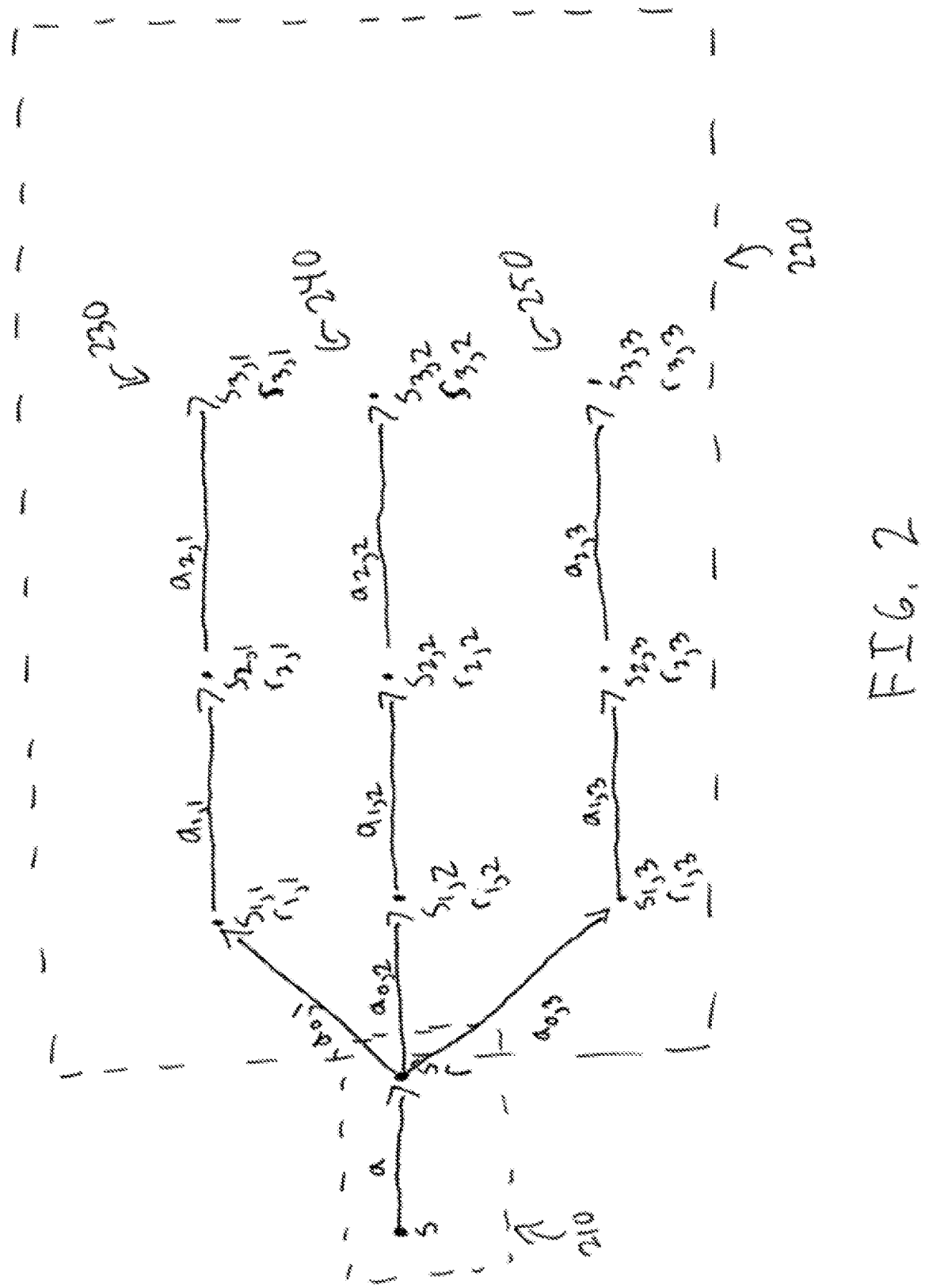
FIG. 2 shows an example of generating trajectories using an ensemble of trajectory models.

FIG. 2 shows an example of generating trajectories using an ensemble of trajectory models.

In the example of FIG. 2, a transition 210 is received that includes an initial training observation s characterizing a state of the environment, a training action a that was performed by the agent in response to the initial observation s, a next training observation s' characterizing the state that the environment transitioned into after the agent performed the action a in response to the observation s, and a training reward r that was received in response to the agent performing the action a.

In order to train the ensemble of Q networks using the transition, the system generates trajectory data 220 using the ensemble of transition models and the transition 210.

In the example of FIG. 2, the trajectory data includes three trajectories 230, 240, and 250, with each trajectory being generated using a different transition model from the ensemble of transition models.

Each trajectory 230, 240, and 250 includes observations at the same predetermined number of time steps, i.e., each trajectory is the same length. In particular, in the example of FIG. 2, each trajectory includes the next training observation s' at time step 0 and then three more predicted observations at time steps 1, 2, and 3.

In particular, to generate the next observation in a given trajectory after the first observation s', the system selects an action using a control policy, i.e., using the action selection policy described above. If the policy is stochastic, the actions $a_{0,1}$ $a_{0,2}$ and $a_{0,3}$ may be different. If the policy is deterministic, the actions $a_{0,1}$ $a_{0,2}$ and $a_{0,3}$ will all be the same given that each trajectory starts from the same next training observation.

The system then processes a transition input that includes the next observation and the selected action using the transition model corresponding to the trajectory to generate a predicted observation, i.e., the observation $s_{1,1}$, the observation $s_{1,2}$, or the observation $s_{1,3}$. Because the transition models will generally have different parameter values the observation $s_{1,1}$, the observation $s_{1,2}$, and the observation $s_{1,3}$ will generally all be different even if the actions $a_{0,1}$ $a_{0,2}$ and $a_{0,3}$ are all the same.

Taking the trajectory 240 as an example, the system then again selects an action $a_{1,1}$ using the control policy and starting from the observation $s_{1,1}$ and uses the transition model corresponding the trajectory 240 to generate the predicted observation $s_{2,1}$. The system then repeats this process starting from the predicted observation $s_{2,1}$ to select an action @2.1 and generate the predicted observation $s_{3,1}$. In other words, the system continues generating new observations for each trajectory until each trajectory includes a respective observation at the predetermined number of time steps.

The system also generates rewards for each time step in each trajectory. While FIG. 2 only shows a single reward per time step and per trajectory, e.g., the reward $r_{2,1}$ for time step 2 in trajectory 240 for ease of illustration, the system actually generates N rewards per time step in per trajectory, i.e., one reward for each of the N reward models in the ensemble of reward models.

While not shown in FIG. 2, the system also generates Z Q values per each time step and per trajectory, i.e., one Q value for each of the Z Q networks in the ensemble of Q networks.

The system then uses the Z Q values and N rewards at each of the time steps in each of the trajectories 240, 250, and 260 to compute a target Q value for the transition 210 and then uses the target Q value to train one or more of the Q networks in the ensemble.

Generally, the system computes the target Q value in a way that dynamically interpolates between target Q values as of various different time steps within the multiple trajectories, i.e., dynamically interpolates between trajectories of various horizon lengths for each individual transition. In so doing, the system ensures that the training process retains the low sample complexity and other benefits of model-based reinforcement learning while also ensuring that predicting the future state of the environment using the transition model and the reward model does not introduce significant errors into the target Q value despite the transition model and the reward model inherently being imperfect predictors. In other words, the system ensures that errors made by the transition models and the reward models do not prevent the system from learning an effective control policy for the agent.

This training is described in more detail below with reference to FIGS. 3-5.

Figure 3:
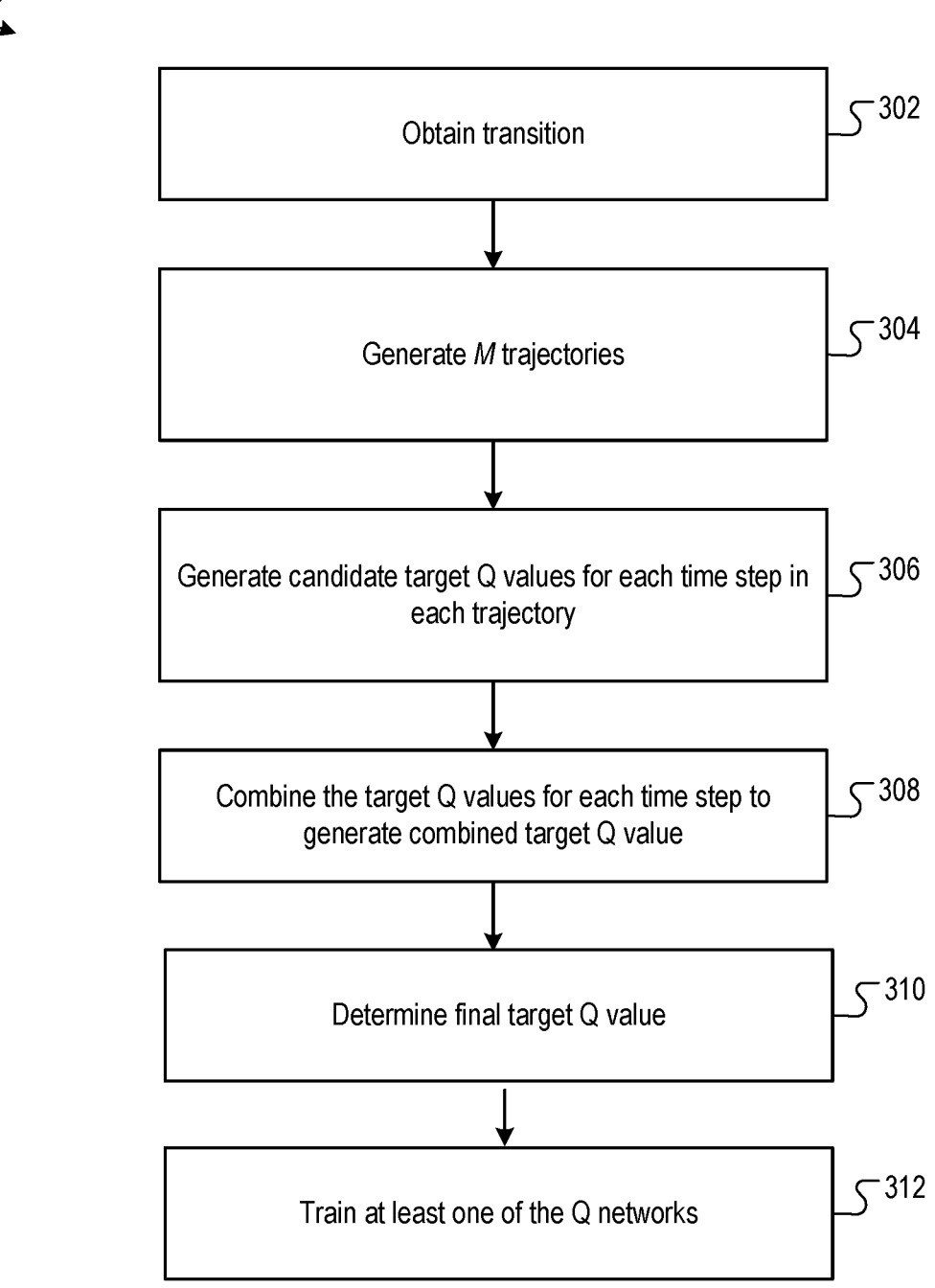
FIG. 3 is a flow diagram of an example process for training an ensemble of Q networks.

FIG. 3 is a flow diagram of an example process 300 for training an ensemble of Q networks. For convenience, the process 300 will be described as being performed by a system of one or more computers located in one or more locations. For example, a reinforcement learning system, e.g., the reinforcement learning system 100 of FIG. 1, appropriately programmed, can perform the process 300.

The system can perform the process 300 for each transition in a mini-batch of transitions that are sampled from a memory that stores transitions that are generated during interaction of the agent with the environment.

By repeatedly performing the process 300 for mini-batches, the system trains the ensemble of Q networks so that the ensemble can be used to effectively control the agent (when the Q networks are directly used to control the agent) or to improve the training of a policy neural network that is being trained jointly with the ensemble of Q networks.

The system obtains a transition (step 302). The transition includes (i) an initial training observation, (ii) a training action, (iii) a training reward, and (iv) a next training observation. As described above, the training action is the action that was performed by the agent in response to the initial observation, the training reward is the reward received in response to the agent performing the training action, and the next training observation characterizes the state that the environment transitioned into after the agent performed the training action.

The system generates, using the ensemble of transition models, M trajectories (step 304). That is, the system generates a respective trajectory using each of the M transition models in the ensemble. Each of the M trajectories starts from the next training observation in the transition and includes a respective observation at each of a predetermined number of time steps.

In particular, to generate a trajectory using a transition model, the system selects an action to be performed in response to the next observation using some action selection policy.

The system then processes a transition input that includes (i) the next observation and (ii) data identifying the selected action using the transition model to generate a predicted next observation characterizing the state that the environment would transition into as a result of the agent performing the selected action in response to the next observation.

The system can continue selecting actions and then generating predicted observations using the transition model until the trajectory includes an observation at each of the predetermined number of time steps.

In some implementations, the action selection policy employed by the system is to select each action using the policy neural network that is being trained using the ensemble of Q networks.

In some other implementations, the action selection policy employed by the system is to select each action using (i) a respective one of the Q networks, (ii) a Q network with parameter values that are an older copy of the parameters of the Q networks in the ensemble, (iii) an average of the outputs of the Q networks in the ensemble. In these implementations, the system can select the action that has the highest Q value when processed along with the observation.

The system generates L*N candidate target Q values for each time step in each trajectory (step 306). In particular, for a given time step in a trajectory, the system generates a respective target Q value using each possible combination of the L Q networks and the N reward models, resulting in L*N candidate target Q values being generated for a given time step in a given trajectory. Generating candidate target Q values is described in more detail below with reference to FIG. 5.

The system combines the M*L*N candidate target Q values for the time step from the M trajectories to generate a combined candidate target Q value for the time step (step 308). That is, the system combines the M*L*N candidate target Q values for the time step across all M trajectories to generate the combined candidate target Q value for the time step. Generating the combined candidate target Q value for a time step is described in more detail below with reference to FIG. 4.

The system determines a final target Q value for the transition from the combined target Q values for the time steps (step 310). For example, the system can sum or average the combined target Q values for the time step to generate the final target Q value.

The system trains at least one of the Q networks using the final target Q value (step 312).

As a particular example, each transition in a mini-batch can be assigned to a respective one of the Q networks in the ensemble. That is, the transitions in the mini-batch can be partitioned into random partitions, with each partition being assigned to a respective one of the Q networks in the ensemble. In this example, the system trains the Q network to which the transition is assigned using the final target Q value and, by performing the process 300 for all of the transitions in the mini-batch, the system trains all of the Q networks in the ensemble.

To train a Q network using the final target Q value, the system processes the initial observation and the initial action in the transition using the Q network to generate a Q value and then determines, through backpropagation, gradients with respect to the Q network parameters of an error, e.g., a square of the difference, between the Q value and the final target Q value. The system can then update the values of the Q network parameters using the computed gradients for all of the transitions in the mini-batch that are assigned to the Q network, e.g., in accordance with an update rule for an optimizer, e.g., the Adam update rule, the rmsProp update rule, or the stochastic gradient descent update rule.

In some cases, the system performs the steps necessary to generate the final target Q values using an older copy of the parameters of the Q network. That is, the system maintains current values and older values for the parameters of the Q networks in the ensemble and only periodically updates the older values to match the current values during the training. The system can use the current values when updating the policy neural network and use the older values when generating target Q values for training the ensemble of Q networks.

Figure 4:
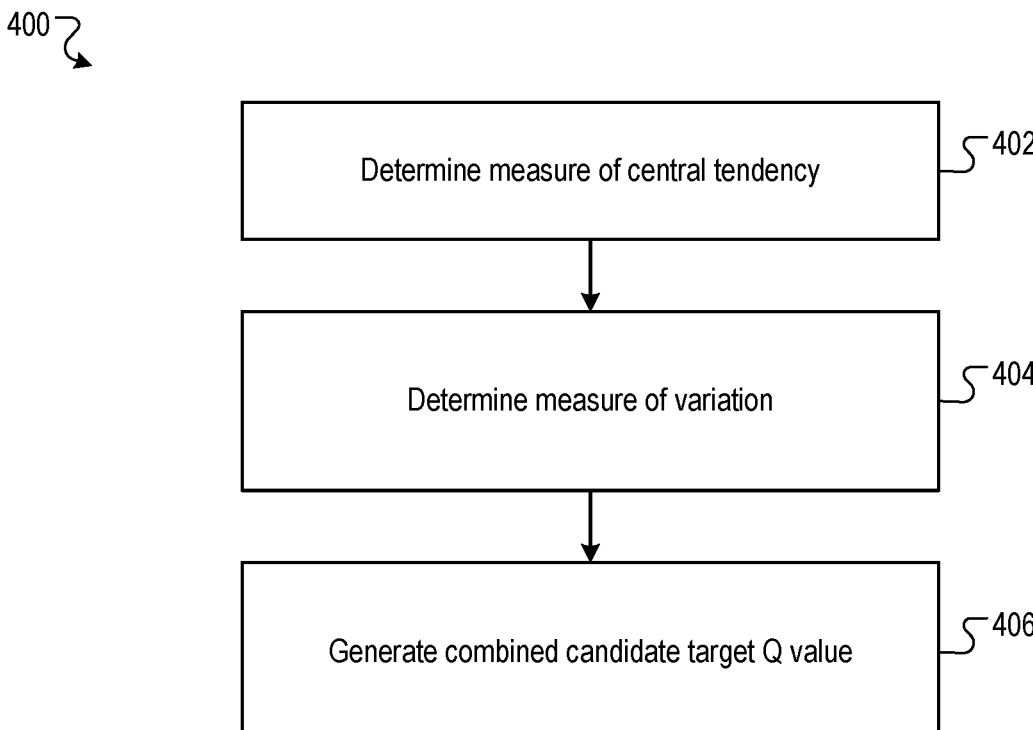
FIG. 4 is a flow diagram of an example process for generating a combined candidate target Q value.

FIG. 4 is a flow diagram of an example process 400 for generating a combined candidate target Q value. For convenience, the process 400 will be described as being performed by a system of one or more computers located in one or more locations. For example, a reinforcement learning system, e.g., the reinforcement learning system 100 of FIG. 1, appropriately programmed, can perform the process 400.

The system determines a measure of central tendency of the M*L*N candidate target Q values for the time step (step 402). In other words, the system computes a measure of central tendency, e.g., a mean or a median, of the M*L*N candidate target Q values for the time step across all of the M trajectories.

The system determines a measure of variation of the M*L*N candidate target Q values for the time step (step 404). In other words, the system computes a measure of variation, e.g., a variance, a standard deviation, or a numerically stable standard deviation, of the M*L*N candidate target Q values for the time step across all of the M trajectories.

The system generates the combined candidate target Q value for the time step based on the measure of central tendency and the measure of variation for the time step (step 406). In particular, the combined candidate target Q value can satisfy:

$$\frac{\hat{\omega}_i}{\sum_j \hat{\omega}_j} \mathcal{T}_i^\mu, \hat{\omega}_i^{-1} = \mathcal{T}_i^{\sigma^2},$$

where $$\mathcal{T}_i^\mu$$

is the measure of central tendency, $$\mathcal{T}_i^{\sigma^2}$$

is the measure of variation, and j ranges over all of the time steps in the trajectories.

Figure 5:
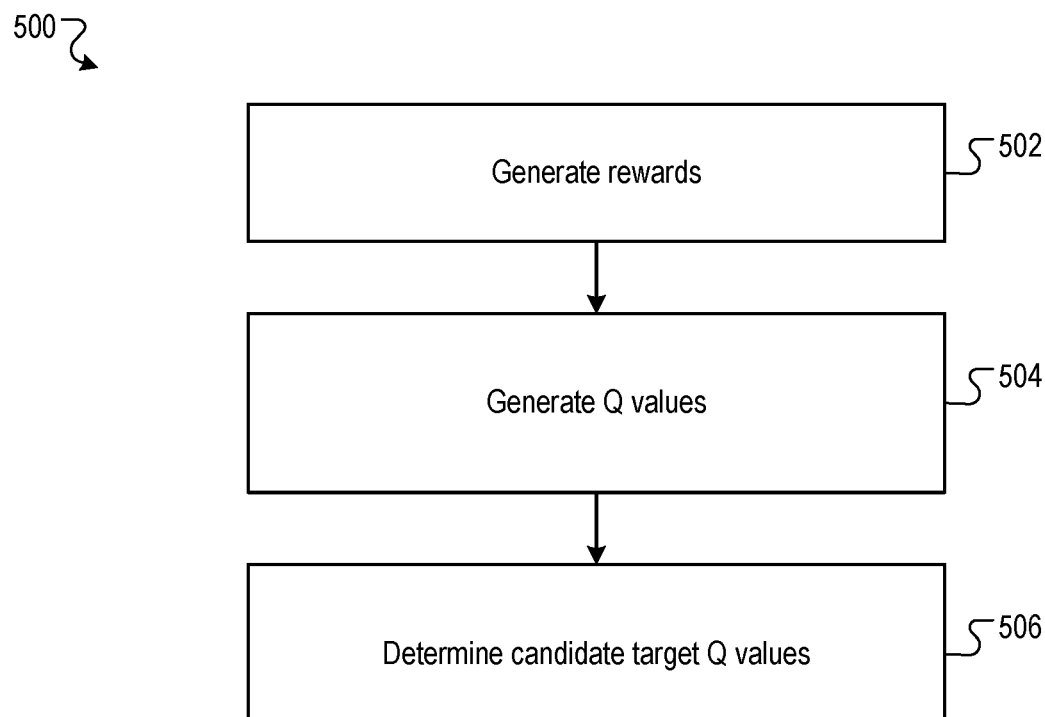
FIG. 5 is a flow diagram of an example process for generating candidate target Q values for a time step in a trajectory.

FIG. 5 is a flow diagram of an example process 500 for generating candidate target Q values for a time step in a trajectory. For convenience, the process 500 will be described as being performed by a system of one or more computers located in one or more locations. For example, a reinforcement learning system, e.g., the reinforcement learning system 100 of FIG. 1, appropriately programmed, can perform the process 500.

The system can perform the process 500 for each time step in each trajectory in order to generate L*N candidate target Q values for each time step in each trajectory.

The system generates, using the ensemble of reward models, N rewards for the time step (step 502). In particular, the system processes a reward input that includes the observation at the preceding time step, the action performed in response to the observation at the preceding time step, and the observation at the time step using each of the N reward models in the ensemble to generate the N rewards for the time step.

The system generates, using the ensemble of Q networks, L Q values for the time step (step 504). In particular, the system processes a Q network input that includes (i) the observation at the time step and (ii) data identifying the action that was performed in response to the observation at the time step from a set of actions and process the Q network input using each of the Z Q networks to generate Z Q values.

The system determines, from the N rewards, the L*Q values, and the training reward, L*N candidate target Q values for the time step (step 506).

To generate the candidate target Q values for the time step, the system computes, for each combination of (i) a reward model from the N reward models and (ii) a Q network from the L Q networks, a respective model-based value expansion target. In particular, the candidate target Q value for a given time step H in a given trajectory according to a reward model n and a Q network l satisfies:

$$r + \left( \sum_{i=1}^{H} D^i \gamma^i r_n(s_{i-1}, a_{i-1}, s_i) \right) + D^{H+1} \gamma^{H+1} Q_l(s_H, a_H),$$

where r is the training reward, $D^i$ is the probability that a terminal state i.e., a state in which a task has successfully been completed or some other termination criterion has been met when the environment transitions into the state, has not been reached by the trajectory as of the time step i, $\gamma$ is a fixed discount factor between zero and one, $r_n(s_{i-1}, a_{i-1}, s_i)$ is the reward generated for the time step i by reward model n, and $Q_l(s_H, a_H)$ is the Q value for the time step H.

The system can compute the probability $D^i$ in any of a variety of ways. For example, the system can have access to data that identifies certain states as terminal states. The system can determine whether any given state in the trajectory is a terminal state using this data and can assign a probability of one to each state that is before the first state in the trajectory that is a terminal state and a probability of zero to the first terminal state and each state after the first terminal state in the trajectory.

As another example, the system can maintain a termination model that receives as input an observation and returns a probability that the state characterized by the observation is a terminal state. In this example, the system can compute $$D^i = \prod_{j=0}^{i} (1 - d(s_j)),$$

where $d(s_j)$ is the output of the termination model for the observation at time step j.

Because the system computes the candidate target Q value as shown above using every possible combination of reward model and Q network, the result is L*N candidate target Q values for each time step in a given trajectory.

In some cases, the values of the parameters of the reward models and the transition models are fixed, i.e., the reward models and the transition models are pre-trained prior to the training of the ensemble of Q networks. In other cases, like the Q networks in the ensemble, the system trains each reward model and each transition model on a subset of the transitions in the minibatch.

In particular, the system can train the reward models, the transition models and, when used, the termination model to minimize the following loss function using supervised learning:

$$E\left( \|T(s, a) - s'\|^2 + H(de(s'), d(T(s, a))) + (r(s, a, s') - r)^2 \right),$$

where E is the expectation function, T(s,a) is the predicted observation by processing the initial observation and the initial action in the transition, s' is the next observation in the transition, H is the cross-entropy function, and de(s') is an indicator function that returns 1 when the next observation characterizes a terminal state and 0 otherwise.

The above description indicates that ensembles of models are used to generate uncertainty and variation between different trajectories, i.e., different transitions generated by the transition model, different rewards generated by the reward model, and different Q values generated by the Q network. However, it should be understood that other techniques for incorporating uncertainty into predictions made by a machine learning model can replace any or all of the ensembles in this specification. For example, one or more of the ensembles can instead be replaced with a single Bayesian neural network and the system can sample multiple times form the same Bayesian neural network to generate the outputs that are described as being generated by the ensemble. As another example, one or more of the ensembles can instead be replaced with a single neural network and the system can use Dropout to drop out, i.e., disable, different sets of nodes in the neural network to generate the requisite multiple outputs.

Although the subject technologies have been described primarily within the context of a physical real-world environment, it will be appreciated that the techniques described herein may also be utilized with non-real-world environments. For instance, in some implementations the environment may be a simulated environment and the agent may be implemented as one or more computers interacting with the simulated environment.

The simulated environment may be a motion simulation environment, e.g., a driving simulation or a flight simulation, and the agent may be a simulated vehicle navigating through the motion simulation. In these implementations, the actions may be control inputs to control the simulated user or simulated vehicle.

In another example, the simulated environment may be a video game and the agent may be a simulated user playing the video game. Generally, in the case of a simulated environment, the observations may include simulated versions of one or more of the previously described observations or types of observations and the actions may include simulated versions of one or more of the previously described actions or types of actions.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations.

Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, .e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:

maintaining an ensemble of Q networks, each Q network being a neural network that is configured to receive a Q network input comprising (i) an input observation characterizing a state of an environment being interacted with by an agent and (ii) data identifying an action from a set of actions and process the Q network input to generate a Q value for the input observation-action pair;

maintaining an ensemble of transition models, each transition model being configured to receive a transition input comprising (i) an input observation and (ii) an action performed by the agent in response to the input observation and to process the transition input to generate a predicted next observation characterizing a state that the environment transitioned into as a result of the agent performing the action in response to the input observation;

maintaining an ensemble of reward models, each reward model being configured to receive a reward input comprising (i) an input observation, (ii) an action performed by the agent in response to the input observation, and (iii) a next observation characterizing a state that the environment transitioned into as a result of the agent performing the action in response to the input observation and to process the reward input to generate a predicted reward received by the agent in response to performing the action;

obtaining a transition, the transition comprising (i) an initial training observation, (ii) a training action, (iii) a training reward, and (iv) a next training observation;

generating, using the ensemble of transition models, a plurality of trajectories starting from the next training observation in the transition, each of the plurality of trajectories comprising a respective observation at each of a plurality of time steps, wherein each of the plurality of trajectories is generated using a different transition model in the ensemble of transition models;

for each of the plurality of trajectories and for each of the plurality of time steps:

(i) generating, using the ensemble of reward models, a respective plurality of rewards for the time step of the trajectory, wherein each of the respective plurality of rewards is generated using a different reward model in the ensemble of reward models, (ii) generating, using the ensemble of Q networks, a respective plurality of Q values for the time step of the trajectory, and (iii) determining, from the respective plurality of rewards, the respective plurality of Q values, and the training reward, L*N respective candidate target Q values for the trajectory and for the time step, wherein L is the number of the plurality of Q values, and N is the number of the plurality of rewards;

for each of the plurality of time steps, generating a combined candidate target Q value for the time step by combining the M*L*N candidate target Q values generated for the time step using the different reward models for the time step from the plurality of trajectories generated using the different transition models, wherein M is the number of the plurality of trajectories;

determining a final target Q value based on a sum or average of the combined candidate target Q values across the plurality of time steps;

training at least one of the Q networks in the ensemble using the final target Q value;

generating a policy neural network using the ensembles of Q networks, wherein the policy neural network is configured to process an input that comprises a current observation characterizing a current state of the environment to generate an action selection output used to select an action for the agent, wherein current observation includes one or more of: images of the environment, object position data describing positions of one or more objects in the environment, or sensor data.

2. The method of claim 1, wherein the transition is one of the transitions in a mini-batch of transitions, wherein each transition in the mini-batch is assigned to a respective one of the Q networks in the ensemble, and wherein training at least one of the Q networks in the ensemble using the final target Q value comprises training the Q network to which the transition is assigned using the final target Q value.

3. The method of claim 1, further comprising: training at least one of the transition models and at least one of the reward models on the transition.

4. The method claim 1, further comprising: training a policy neural network using the ensemble of Q networks.

5. The method of claim 4, wherein generating, using the ensemble of transition models, M trajectories starting from the next training observation in the transition, comprises, for each trajectory and at each time step, selecting the action at the time step using the policy neural network.

6. The method of claim 1, wherein generating, using the ensemble of transition models, M trajectories starting from the next training observation in the transition, comprises, for each trajectory and at each time step, selecting the action at the time step using (i) a respective one of the Q networks or (ii) a Q network with parameter values that are an older copy of the parameters of the Q networks in the ensemble.

7. The method of claim 1, wherein for each of the time steps, combining the M*L*N candidate target Q values for the time step from the M trajectories to generate a combined candidate target Q value for the time step comprises:

determining a measure of central tendency of the M*L*N candidate target Q values for the time step;

determining a measure of variation of the M*L*N candidate target Q values for the time step; and generating the combined candidate target Q value for the time step based on the measure of central tendency and the measure of variation.

8. The method of claim 7, wherein the combined candidate target Q value for time step i satisfies:

$$\frac{\bar{\omega}_i}{\sum_{j}\bar{\omega}_j}\mathcal{T}_i^{\mu},\ \bar{\omega}_i^{-1}=\mathcal{T}_i^{\sigma^2}$$

18 where $$\mathcal{T}_i^{\mu}$$

is the measure of central tendency, $$\mathcal{T}_i^{\sigma^2}$$

is the measure of variation, and j ranges over all of the time steps.

9. The method of claim 1, wherein the observation at the first time step in each of the trajectories is the next training observation.

10. The method of claim 1, wherein determining, from the N rewards, the training reward, and the L Q values, L*N candidate target Q values for the trajectory and for the time step comprises:

for each combination of (i) reward model and (ii) a Q network, determining a respective model-based value expansion target.

11. The method of claim 1, wherein the environment is a real-world environment, the agent is a mechanical agent configured to interact with the real-world environment, and the observations include one or more of: images of the environment, object position data describing positions of one or more objects in the environment, or sensor data to capture observations as the agent interacts with the environment.

12. The method of claim 1, wherein the agent is configured to control actions of items of equipment in a plant or service facility, the observations relate to operation of the plant or service facility, and the actions include actions which control or impose operating conditions on the items of equipment of the plant or service facility and/or actions that result in changes to settings in the operation of the plant or service facility.

13. One or more non-transitory computer readable storage media storing instructions that when executed by one or more computers cause the one or more computers to perform operations comprising:

maintaining an ensemble of Q networks, each Q network being a neural network that is configured to receive a Q network input comprising (i) an input observation characterizing a state of an environment being interacted with by an agent and (ii) data identifying an action from a set of actions and process the Q network input to generate a Q value for the input observation-action pair;

maintaining an ensemble of transition models, each transition model being configured to receive a transition input comprising (i) an input observation and (ii) an action performed by the agent in response to the input observation and to process the transition input to generate a predicted next observation characterizing a state that the environment transitioned into as a result of the agent performing the action in response to the input observation;

maintaining an ensemble of reward models, each reward model being configured to receive a reward input comprising (i) an input observation, (ii) an action performed by the agent in response to the input observation, and (iii) a next observation characterizing a state that the environment transitioned into as a result of the agent performing the action in response to the input observation and to process the reward input to generate a predicted reward received by the agent in response to performing the action;

obtaining a transition, the transition comprising (i) an initial training observation, (ii) a training action, (iii) a training reward, and (iv) a next training observation;

generating, using the ensemble of transition models, a plurality of trajectories starting from the next training observation in the transition, each of the plurality of trajectories comprising a respective observation at each of a plurality of time steps, wherein each of the plurality of trajectories is generated using a different transition model in the ensemble of transition models;

for each of the plurality of trajectories and for each of the plurality of time steps:

(i) generating, using the ensemble of reward models, a respective plurality of rewards for the time step of the trajectory, wherein each of the respective plurality of rewards is generated using a different reward model in the ensemble of reward models, (ii) generating, using the ensemble of Q networks, a respective plurality of Q values for the time step of the trajectory, and (iii) determining, from the respective plurality of rewards, the respective plurality of Q values, and the training reward, L*N respective candidate target Q values for the trajectory and for the time step, wherein L is the number of the plurality of Q values, and N is the number of the plurality of rewards;

for each of the plurality of time steps, generating a combined candidate target Q value for the time step by combining the M*L*N candidate target Q values generated for the time step using the different reward models for the time step from the plurality of trajectories generated using the different transition models, wherein M is the number of the plurality of trajectories;

determining a final target Q value based on a sum or average of the combined candidate target Q values across the plurality of time steps;

training at least one of the Q networks in the ensemble using the final target Q value;

generating a policy neural network using the ensembles of Q networks, wherein the policy neural network is configured to process an input that comprises a current observation characterizing a current state of the environment to generate an action selection output used to select an action for the agent, wherein current observation includes one or more of: images of the environment, object position data describing positions of one or more objects in the environment, or sensor data.

14. A system comprising one or more computers and one or more storage devices storing instructions that when executed by the one or more computers cause the one or more computers to perform operations comprising:

maintaining an ensemble of Q networks, each Q network being a neural network that is configured to receive a Q network input comprising (i) an input observation characterizing a state of an environment being interacted with by an agent and (ii) data identifying an action from a set of actions and process the Q network input to generate a Q value for the input observation-action pair;

maintaining an ensemble of transition models, each transition model being configured to receive a transition input comprising (i) an input observation and (ii) an action performed by the agent in response to the input observation and to process the transition input to generate a predicted next observation characterizing a state that the environment transitioned into as a result of the agent performing the action in response to the input observation;

maintaining an ensemble of reward models, each reward model being configured to receive a reward input comprising (i) an input observation, (ii) an action performed by the agent in response to the input observation, and (iii) a next observation characterizing a state that the environment transitioned into as a result of the agent performing the action in response to the input observation and to process the reward input to generate a predicted reward received by the agent in response to performing the action;

obtaining a transition, the transition comprising (i) an initial training observation, (ii) a training action, (iii) a training reward, and (iv) a next training observation;

generating, using the ensemble of transition models, a plurality of trajectories starting from the next training observation in the transition, each of the plurality of trajectories comprising a respective observation at each of a plurality of time steps, wherein each of the plurality of trajectories is generated using a different transition model in the ensemble of transition models;

for each of the plurality of trajectories and for each of the plurality of time steps:

(i) generating, using the ensemble of reward models, a respective plurality of rewards for the time step of the trajectory, wherein each of the respective plurality of rewards is generated using a different reward model in the ensemble of reward models, (ii) generating, using the ensemble of Q networks, a respective plurality of Q values for the time step of the trajectory, and (iii) determining, from the respective plurality of rewards, the respective plurality of Q values, and the training reward, L*N respective candidate target Q values for the trajectory and for the time step, wherein L is the number of the plurality of Q values, and N is the number of the plurality of rewards;

for each of the plurality of time steps, generating a combined candidate target Q value for the time step by combining the M*L*N candidate target Q values generated for the time step using the different reward models for the time step from the plurality of trajectories generated using the different transition models, wherein M is the number of the plurality of trajectories;

determining a final target Q value based on a sum or average of the combined candidate target Q values across the plurality of time steps;

training at least one of the Q networks in the ensemble using the final target Q value;

generating a policy neural network using the ensembles of Q networks, wherein the policy neural network is configured to process an input that comprises a current observation characterizing a current state of the environment to generate an action selection output used to select an action for the agent, wherein current observation includes one or more of: images of the environment, object position data describing positions of one or more objects in the environment, or sensor data.

15. The system of claim 14, wherein the transition is one of the transitions in a mini-batch of transitions, wherein each transition in the mini-batch is assigned to a respective one of the Q networks in the ensemble, and wherein training at least one of the Q networks in the ensemble using the final target Q value comprises training the Q network to which the transition is assigned using the final target Q value.

16. The system of claim 14, the operations further comprising:

training at least one of the transition models and at least one of the reward models on the transition.

17. The system of claim 14, the operations further comprising: training a policy neural network using the ensemble of Q networks.

18. The system of claim 17, wherein generating, using the ensemble of transition models, M trajectories starting from the next training observation in the transition, comprises, for each trajectory and at each time step, selecting the action at the time step using the policy neural network.

19. The system of claim 14, wherein generating, using the ensemble of transition models, M trajectories starting from the next training observation in the transition, comprises, for each trajectory and at each time step, selecting the action at the time step using (i) a respective one of the Q networks or (ii) a Q network with parameter values that are an older copy of the parameters of the Q networks in the ensemble.

20. The method of claim 1, wherein for each of the time steps, generating the combined candidate target Q value for the time step comprises:

determining a measure of central tendency of the M*L*N candidate target Q values for the time step;

determining a measure of variation of the M*L*N candidate target Q values for the time step; and computing the combined candidate target Q value for the time step as the measure of central tendency scaled by a weighting factor that is inversely related to the measure of variation.

* * * * *